US006424355B2

(12) United States Patent
Watanabe et al.

(10) Patent No.: US 6,424,355 B2
(45) Date of Patent: *Jul. 23, 2002

(54) DIGITAL MAP DISPLAY ZOOMING METHOD, DIGITAL MAP DISPLAY ZOOMING DEVICE, AND STORAGE MEDIUM FOR STORING DIGITAL MAP DISPLAY ZOOMING PROGRAM

(75) Inventors: Ryuichi Watanabe, Kanagawa; Masafumi Minami, Tokyo, both of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/088,235

(22) Filed: Jun. 1, 1998

(30) Foreign Application Priority Data

Jun. 2, 1997 (JP) ............................................. 9-144274

(51) Int. Cl.[7] ................................................ G09G 5/00
(52) U.S. Cl. ......................... 345/668; 163/670; 163/671
(58) Field of Search ................................ 340/995, 990; 345/668, 667, 670, 671, 163, 180, 440

(56) References Cited

U.S. PATENT DOCUMENTS

| | | | | |
|---|---|---|---|---|
| 5,030,117 A | * | 7/1991 | Delorme | 434/130 |
| 5,032,989 A | | 7/1991 | Tornetta | 364/401 |
| 5,073,771 A | * | 12/1991 | Satta et al. | 345/127 |
| 5,191,532 A | * | 3/1993 | Moroto et al. | 701/201 |
| 5,266,948 A | * | 11/1993 | Matsumoto et al. | 340/995 |
| 5,377,113 A | * | 12/1994 | Shibazaki et al. | 701/209 |
| 5,625,782 A | * | 4/1997 | Soutome et al. | 345/341 |
| 5,870,090 A | * | 2/1999 | Takai et al. | 345/340 |
| 5,883,619 A | * | 3/1999 | Ho et al. | 345/163 |
| 5,930,787 A | * | 7/1999 | Minakuchi et al. | 707/4 |
| 5,945,982 A | * | 8/1999 | Higashio et al. | 345/203 |
| 5,954,650 A | * | 9/1999 | Saito et al. | 600/425 |
| 5,966,139 A | * | 10/1999 | Anupam et al. | 345/440 |
| 5,977,974 A | * | 11/1999 | Hatori et al. | 345/127 |

FOREIGN PATENT DOCUMENTS

| | | | | |
|---|---|---|---|---|
| DE | 296 21 338 U1 | | 2/1997 | G06F/3/033 |
| WO | WO 96/14633 | | 5/1996 | G09G/5/08 |

OTHER PUBLICATIONS

Rink, J., "Von A Nach B Mit CD," CT Magazin Für Computer Technik, Feb. 1997, pp. 176–197, XP002131801.
*Aldus Digital Darkroom User Manual,* "Working With Selection Tools and Modes," Feb. 1990, Aldus, XP002131800.

* cited by examiner

*Primary Examiner*—Chanh Nguyen
*Assistant Examiner*—Fritz Alphonse
(74) *Attorney, Agent, or Firm*—Oblon, Spivak, McClelland, Maier & Neustadt, P.C.

(57) ABSTRACT

In a digital map display zooming method for enlarging and reducing a displayed portion of a digital map as map information in digital form within a display screen, continuous enlarging operation and continuous reducing operation of the displayed portion of the digital map within the display screen are designated by operating the first designating part and the second designating part of a pointing device, respectively.

11 Claims, 9 Drawing Sheets

DIGITAL MAP DISPLAY ZOOMING METHOD, DIGITAL MAP DISPLAY ZOOMING DEVICE, AND STORAGE MEDIUM FOR STORING DIGITAL MAP DISPLAY ZOOMING PROGRAM

BACKGROUND OF THE INVENTION

The present invention relates to a digital map display zooming method, a digital map display zooming device and a storage medium for storing a digital map display zooming program, which are for enlarging and reducing a displayed portion of a digital map as map information in digital form within a display screen.

Digital maps as map information in digital form are maps put into electronic form so as to be handled on the display screen of a computer as a digital map display device such as a portable notebook type computer etc. This kind of digital map is referred to as an electronic map or map software, where maps can be displayed on a display screen.

With this kind of digital map, a map is displayed on, for example, the display screen of a portable computer so that such an operation that a target is set on the map can be carried out, with these digital maps being applied to car navigation systems etc. in recent years.

Incidentally, the digital map display device has a function for zooming the displayed region of this kind of digital map. With digital map display devices in related art, a user can enlarge or reduce in a plurality of steps using a mouse as a pointing device. This situation is shown in FIG. 1. In FIG. 1, zooming in or zooming out can be carried out in a discontinuous manner within a range of about five steps on scales of 1000, 1001, 1002, 1003 and 1004. The area for which this enlarged or reduced displaying is to be performed can be designated by the direction of dragging the mouse. A "mouse" is a device that can be moved about on a desk so as to designate a specific portion on a screen by pushing a mouse button with a pointer being positioned at the portion. "Dragging" is the action of moving the mouse with the mouse button pushed down.

However, a displayed portion of the digital map can only be enlarged or reduced in a discontinuous manner in a plurality of steps and it is therefore impossible to display an enlarged or reduced displayed portion at the display screen on a scale desired by the user.

It is therefore an object of the present invention to provide a digital map display zooming method, a digital map zooming display device and a storage medium for storing a digital map display zooming program that enable a user to enlarge or reduce a displayed portion of a digital map in a continuous manner within a display screen by solving the above problem.

SUMMARY OF THE INVENTION

The above object is achieved in the present invention by a digital map display zooming method for enlarging and reducing a displayed portion of a digital map as map information in digital form within a display screen of a display device with a pointing device, wherein operations of the first designating part and the second designating part of the pointing device designate continuous enlarging and continuous reducing of the displayed portion of the digital map within the display screen, respectively.

In the present invention, continuously enlarging operation and continuously reducing operation of the displayed portion of the digital map within the display screen can be designated by the operations of the first designating part and second designating part of the pointing device, respectively.

As a result, the user can continuously enlarge or continuously reduce the displayed portion of the digital map within the display screen in a simple manner.

The above object is achieved in the present invention by a digital map display zooming device for enlarging and reducing a displayed portion of a digital map as map information in digital form within a display screen, the device comprising a display section having a display screen for displaying the displayed portion of the digital map, a pointing device, having the first designating part and the second designating part, for continuously enlarging or reducing the displayed portion of the digital map within the display screen by operating the first designating part and the second designating part, respectively, and an arithmetic processor for carrying out processing for performing continuously enlarging operation and continuously reducing operation of a displayed portion designated by operations of the pointing device.

In the present invention, the displayed portion of the digital map is displayed at the display screen of the display section. The pointing device has the first designating part and the second designating part and continuously enlarging operation and continuously reducing operation of the displayed portion of the digital map are carried out within the display screen by. the user operating the first and second designating parts.

The arithmetic processor carries out processing for continuously enlarging operation and continuously reducing operation of the displayed portion designated by operating the pointing device.

In the present invention it is preferable that continuously enlarging operation of the displayed portion can be continued when the first designating part of the pointing device is kept being pressed and continuously reducing operation of the displayed portion can be continued when the second designating part of the pointing device is kept being pressed.

The user can therefore continuously enlarge or continuously reduce the displayed portion of the digital map within the display screen in a simple manner. Moreover, the user can carry out the required enlargement or reduction in a simple manner only by continuing pressing.

The above object is achieved in the present invention by a storage medium for storing a digital map display zooming program for enlarging and reducing a displayed portion of a digital map as map information in digital form within a display screen of a display device with a pointing device, wherein the digital map zooming program includes the steps of designating continuously enlarging operation and continuously reducing operation of the displayed portion of the digital map within the display screen by operations of the first designating part and the second designating part of the pointing device, respectively.

In the present invention, continuously enlarging operation and continuously reducing operation of the displayed portion of the digital map within the display screen can be designated by the operations of the first designating part and the second designating part of the pointing device, respectively.

As a result, the user can continuously enlarge or continuously reduce the displayed portion of the digital map within the display screen in a simple manner.

DESCRIPTION OF THE PREFERRED EMBODIMENTS

In the following a preferred embodiment of the present invention will be described in detail on the basis of the attached drawings.

The embodiment described in the following is a specific preferred example of the present invention and is thereby subject to various technical limitations. However, the scope of the present invention is by no means limited to these forms in the following explanation unless otherwise described to limit the present invention.

Figure 2:
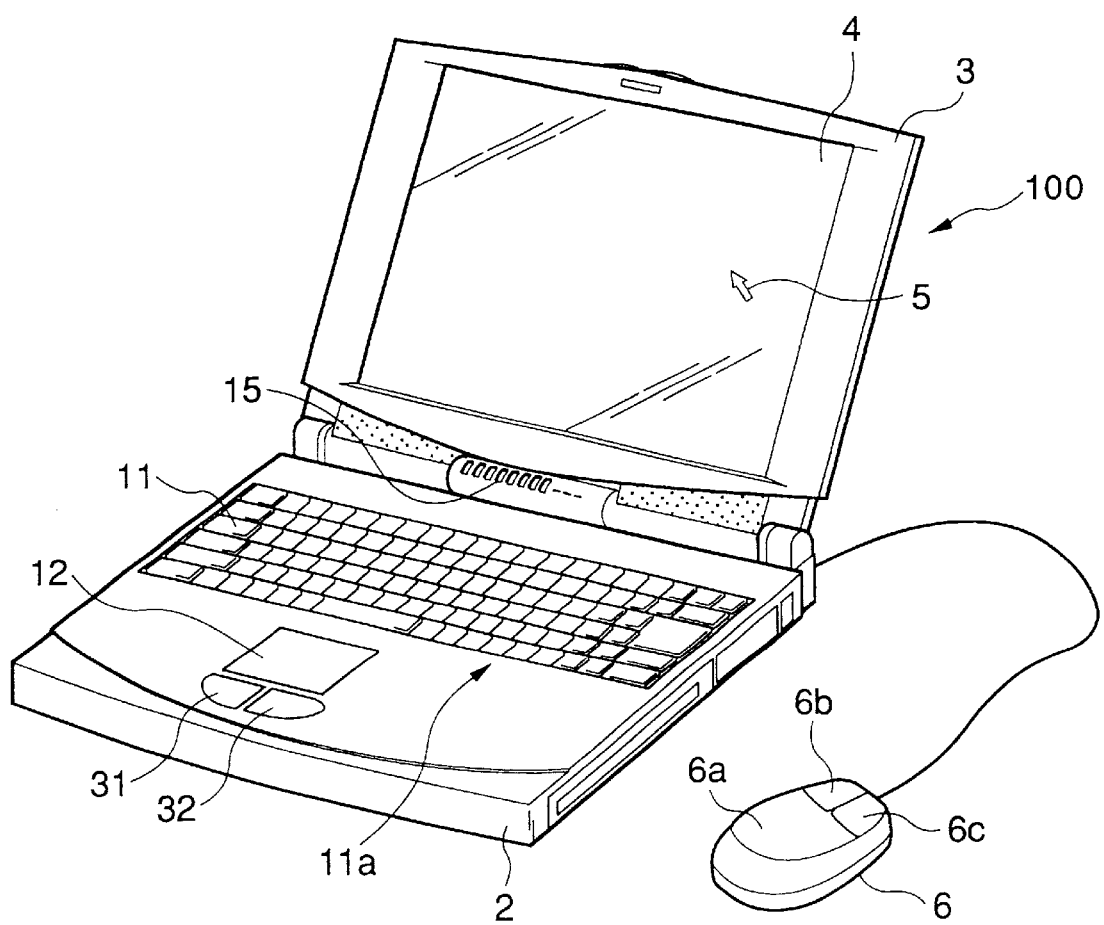
FIG. 2 is a perspective view showing a portable notebook type personal computer as an embodiment of a digital map zooming device of the present invention.

FIG. 2 is a perspective view showing a preferred embodiment of a digital map zooming device 100 of the present invention. A system configuration for this digital map zooming device 100 is shown in FIG. 3.

The digital map zooming device 100 of FIG. 2 is a so-called portable notebook type personal computer which has a main body 2, display means 3, a mouse 6, a touch pad 12 and touch pads 31 and 32. The display means 3 has a display screen 4 to which, for example, a Liquid Crystal Display (LCD) can be adopted. The display means 3 is attached to the main body 2 in such a manner as to be capable of being opened and closed.

The main body 2 has the aforementioned mouse 6, touch pads 12, 31 and 32 and a keyboard 11 as pointing means, and a power supply lamp 15 etc.

Figure 3:
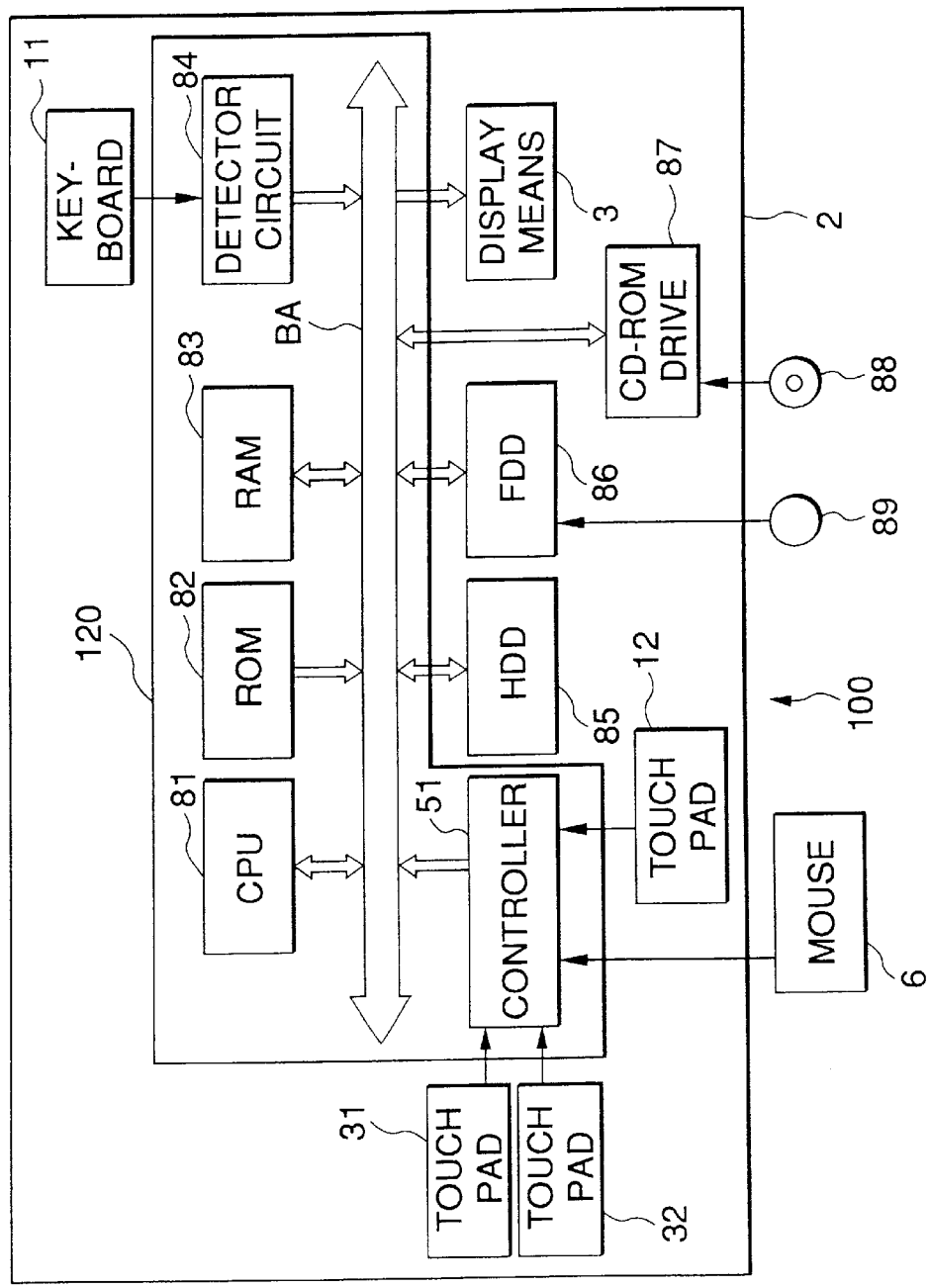
FIG. 3 is a block diagram showing a system for the digital map zooming device of FIG. 2.

FIG. 3 is a block diagram showing the system configuration within the main body 2 and the display means 3.

The main body 2 has a floppy disc drive (FDD) 86, a CD-ROM (read-only memory utilizing a compact disc) drive 87, a detector circuit 84 for a keyboard 11, a CPU (central processing unit) 81, a ROM (read-only memory) 82, a RAM (random access memory) 83 and a controller 51.

Touch pads 12, 31, 32 and a mouse 6 are connected to a controller 51. The controller 51, the ROM 82, the RAM 83, the detector circuit 84, the hard disc drive 85, the floppy disc drive 86 and the CD-ROM drive 87 are connected to a CPU 81 via a bus BA.

The mouse 6 of FIG. 2 has a mouse body 6a, a left button 6b and a right button 6c. The touch pad 31 with a function similar to that of the left button and the touch pad 32 with a function similar to that of the right button are provided below the touch pad 12.

The CPU 81 of FIG. 3 executes various processings in accordance with a program stored at the ROM 82. The data and programs etc. necessary for the CPU 81 to execute various processes are stored in an appropriate manner at the RAM 83. The detector circuit 84 detects operation of the key 11 and outputs a detection signal to the CPU 81.

The hard disc drive (HDD) 85 stores programs processed by the CPU 81 and data etc. in an appropriate manner. The floppy disc drive (FD) 86 records and plays back data to and from a floppy disc 89 installed therein.

The controller 51 detects operations of the touch pad 12, the touch pads 31 and 32 and the mouse 6 and outputs a detection signal to the CPU 81.

When the user shifts a pointer 5 using the touch pads 12, 31 and 32, the user touches (presses) a prescribed position on the touch pad 12 with their finger, and shifts this touching position in the direction that the pointer 5 is to be shifted. The controller 51 detects this operation, i.e. when the user applies a pressure to the touch pad 12 with their finger, the electrostatic capacity of the position being pressed changes. For example, when a certain position on the touch pad 12 is pressed by a finger, the electrostatic capacitance between a horizontal electrode and a vertical electrode changes largely compared to the electrostatic capacitance between other electrodes.

When a key of the keyboard 11 is operated, the detector circuit 84 outputs a detection signal corresponding to this operation to the CPU 81. The CPU 81 then generates, for example, prescribed character data in accordance with this inputted detection signal with this character data being outputted to the display screen 4 and displayed. In a similar manner, the CPU 81 reads out graphics data for the pointer 5 stored in the ROM 82 and outputs this data to the display screen 4 for displaying. In this way, the pointer 5 is displayed as shown, for example, in FIG. 2.

The controller 51, CPU 81, ROM 82, RAM 83 and detector circuit 84 in FIG. 3 comprise arithmetic processing means 120. The arithmetic processing means 120 is a section having a function for carrying out enlarging and reducing operations of the displayed portion of a digital map within the display screen as a result of operations of the left button 6b and right button 6c of the mouse 6 or the touch pads 12, 31 and 32 as the pointing means.

The program for the digital map display zooming method of this embodiment of the present invention is operated by an operating system such as, for example, Windows' 95 of the Microsoft Co., Ltd. in U.S., and is stored, for example, on a CD-ROM 88. The digital map display zooming program on the CD-ROM 88 can therefore be put onto the hard disc drive 85 by inserting this CD-ROM 88 into the CD-ROM drive 87. The "operating system" (OS) is a software with functions such as "application execution" and "file management" that form the basis for using the computer.

Alternatively, such digital map display zooming program can be stored on a floppy disc 89 instead of a CD-ROM 88. When this floppy disc 89 is inserted into the floppy disc drive 86, the digital map display zooming program within this floppy disc 89 is put onto the hard disc drive 85.

Alternatively, the digital map display zooming program can be put onto the hard disc drive 85 from outside via a network such as the internet.

Figure 1:
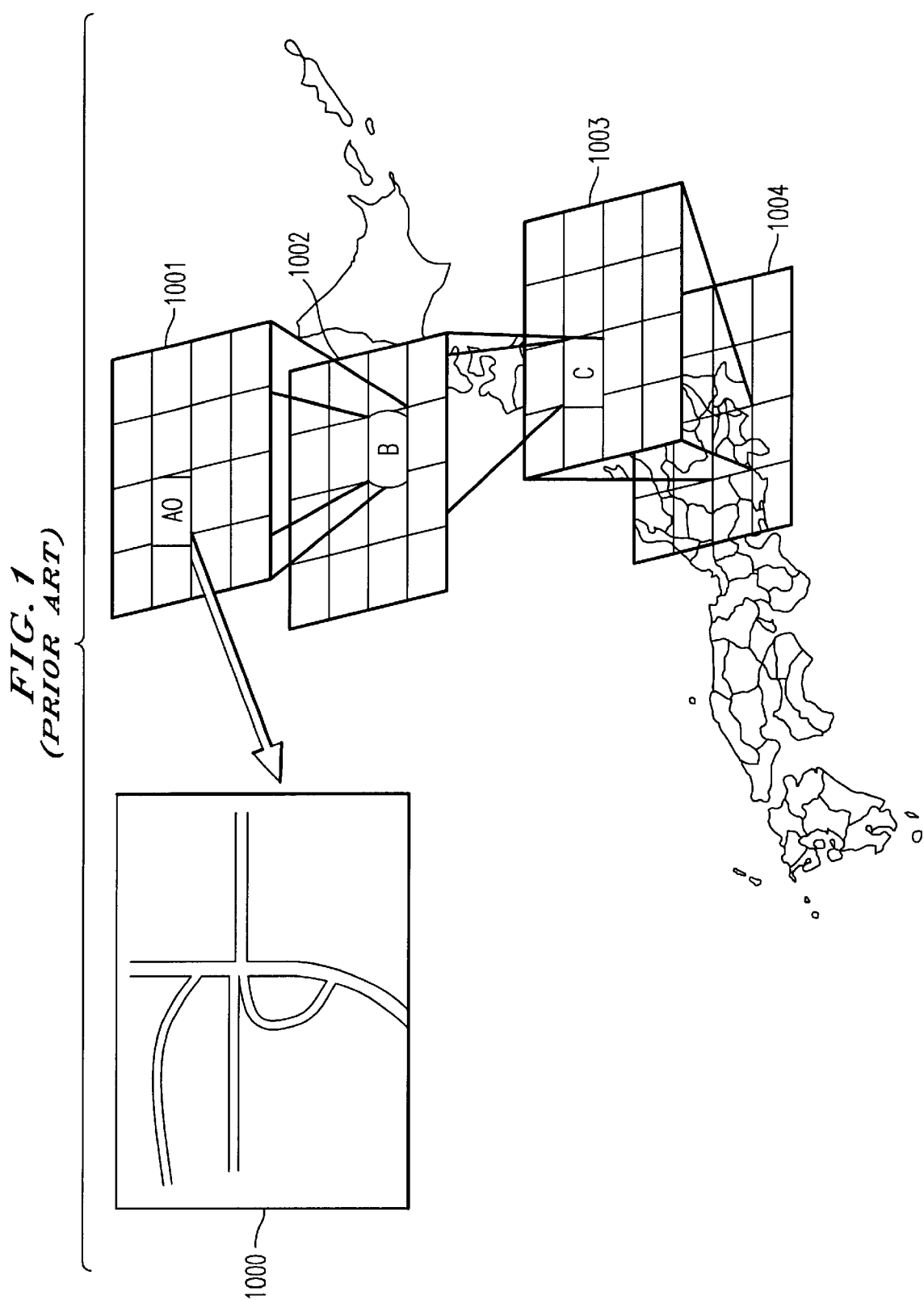
FIG. 1 is a view showing how discontinuous enlargement and reduction of a digital map is carried out in related art.
Figure 4:
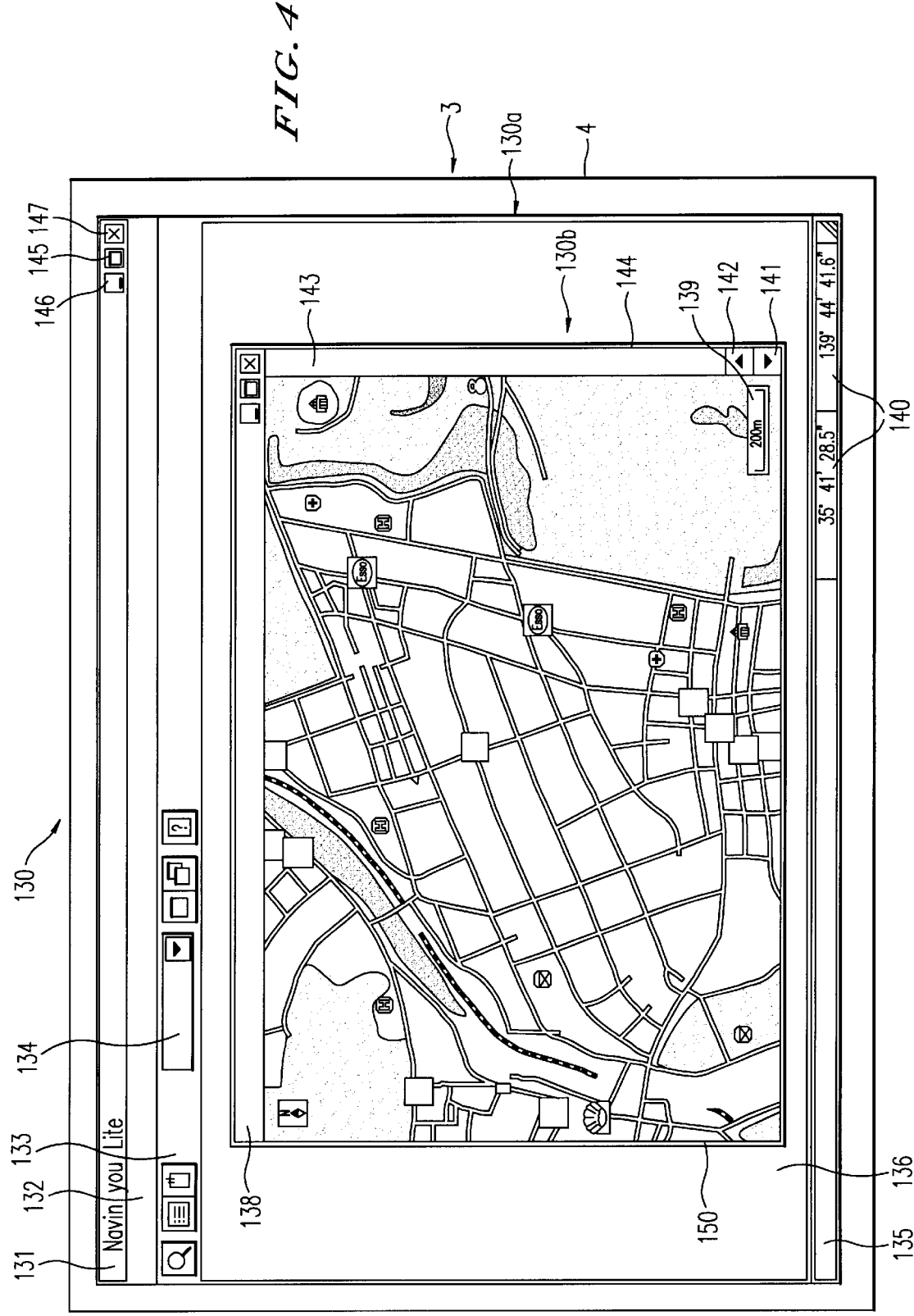
FIG. 4 is a view showing an example of a displayed portion of a digital map displayed on the display screen of the digital map display zooming device of FIG. 2.

Next, FIG. 4 shows an image 130 included in a digital map display zooming program displayed on the display screen 4 of the display means 3 of FIG. 1 and FIG. 2. Although this image 130 is simply an example, a title bar 131, a menu bar 132, a tool bar 133, a (information display) list box 134, a guidance area 135, a map display region 136, a map window title bar 138, a scale display 139, a latitude/longitude display 140, a (zoom in) button 141, a (zoom out) button 142, a scale bar 143, a scale bar knob (also referred to as "slider") 144, a maximizing button 145, a minimizing button 146 and an X button (close button) 147 etc. are displayed within this image 130. A separate window 130b is displayed within a window 130a of the image 130. An example of a displayed portion 150 of the digital map is displayed within this window 130b. The menu bar 132 is positioned below the title bar 131 and is lined up with function names, and when clicking is performed with the pointer 5 being positioned at this menu bar 132, a more detailed display is presented. The term "clicking" means an operation of quickly pressing and releasing the mouse button.

Figure 5:
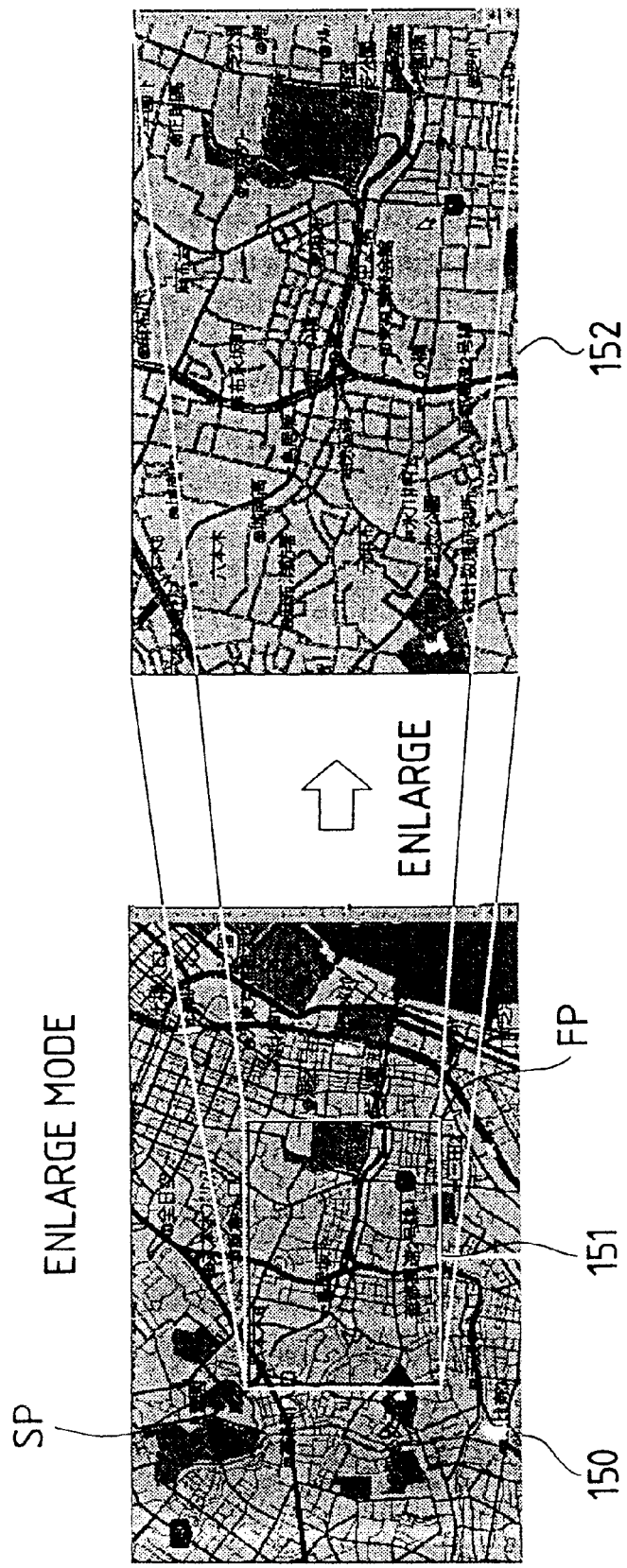
FIG. 5 is a view showing an example of enlargement in enlarging mode of a region designated as a portion to be enlarged.

FIG. 5 shows an example in which a user operates the mouse 6 of FIG. 2 so as to designate a rectangular or square region on the displayed portion that is desired to be enlarged using the pointer 5 of FIG. 2. The example of FIG. 5 shows a state in which a designated region 151 of a displayed portion 150 is enlarged into an enlarged region 152.

This designated region 151 is a region that is narrower than the region for the displayed portion 150 and can be designated to be in a rectangular or square shape by dragging the mouse 6. When one wishes to enlarge the designated region 151, which is designated in enlarging mode, to the enlarged region 152 as shown in FIG. 5, the enlarging operation can be carried out by moving the mouse 6 on a desk while holding down the left button 6b of the mouse 6. The enlarged region 152 can then easily be set in this case by dragging the mouse 6 so as to move the pointer 5 diagonally from the start point SP of the desired enlargement in FIG. 5 to the end point FP.

Figure 6:
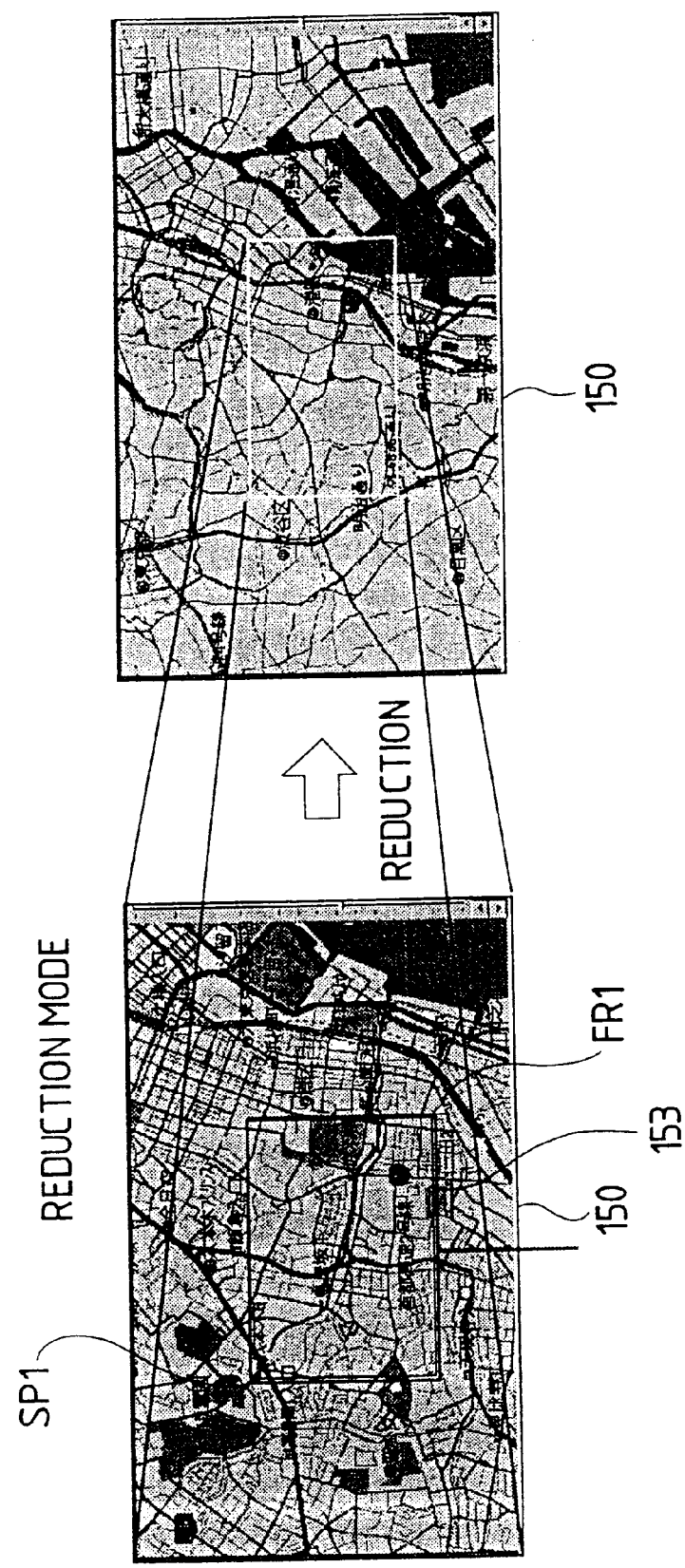
FIG. 6 is a view showing an example of reduction to a region with the size designated at a displayed portion.

Conversely, FIG. 6 shows reducing mode. Here, by designating a region 153 of a designated size within the displayed portion 150, the whole of the displayed portion 150 can be made to be included into this designated region 153. Namely, to what size the displayed portion 150 is to be reduced is designated by this region 153 of the designated size. This region 153 of the designated size can be set by designating a start point SP1 with the pointer 5 by pressing the right button 6c of the mouse 6, dragging the mouse 6 diagonally and designating the end point FP1.

When enlarging as shown in FIG. 5, the left button 6b of the mouse 6 of FIG. 2 is pressed. The region designated within the displayed portion 150 can be enlarged one step at a time every time this left button 6b is pressed. Further, as shown in FIG. 6, in reducing mode, the displayed portion 150 can be reduced to the region of the designated size one step at a time every time the right button 6c of the mouse 6 is pressed. If the left button 6b of the mouse 6 is continued to be pressed, continuous enlargement is possible, and if the right button 6c of the mouse 6 is continued to be pressed, continuous reduction is possible.

Figure 7:
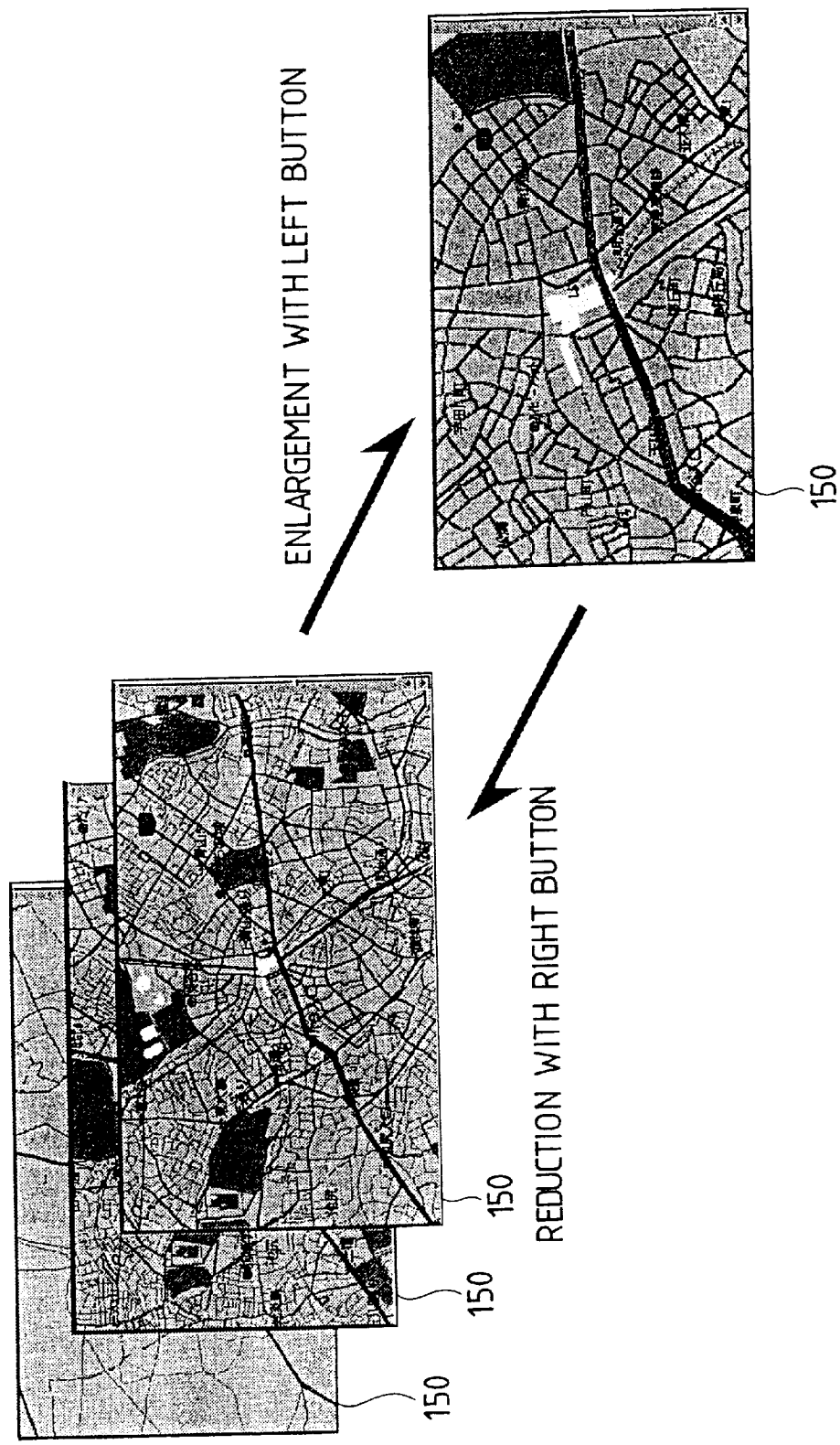
FIG. 7 is a view showing how a displayed portion is continuously enlarged or reduced by using the left button or right button of the mouse.

FIG. 7 shows how enlarging is performed using the left button 6b of the mouse 6 and how reduction is performed using the right button 6c of the mouse 6.

Figure 8:
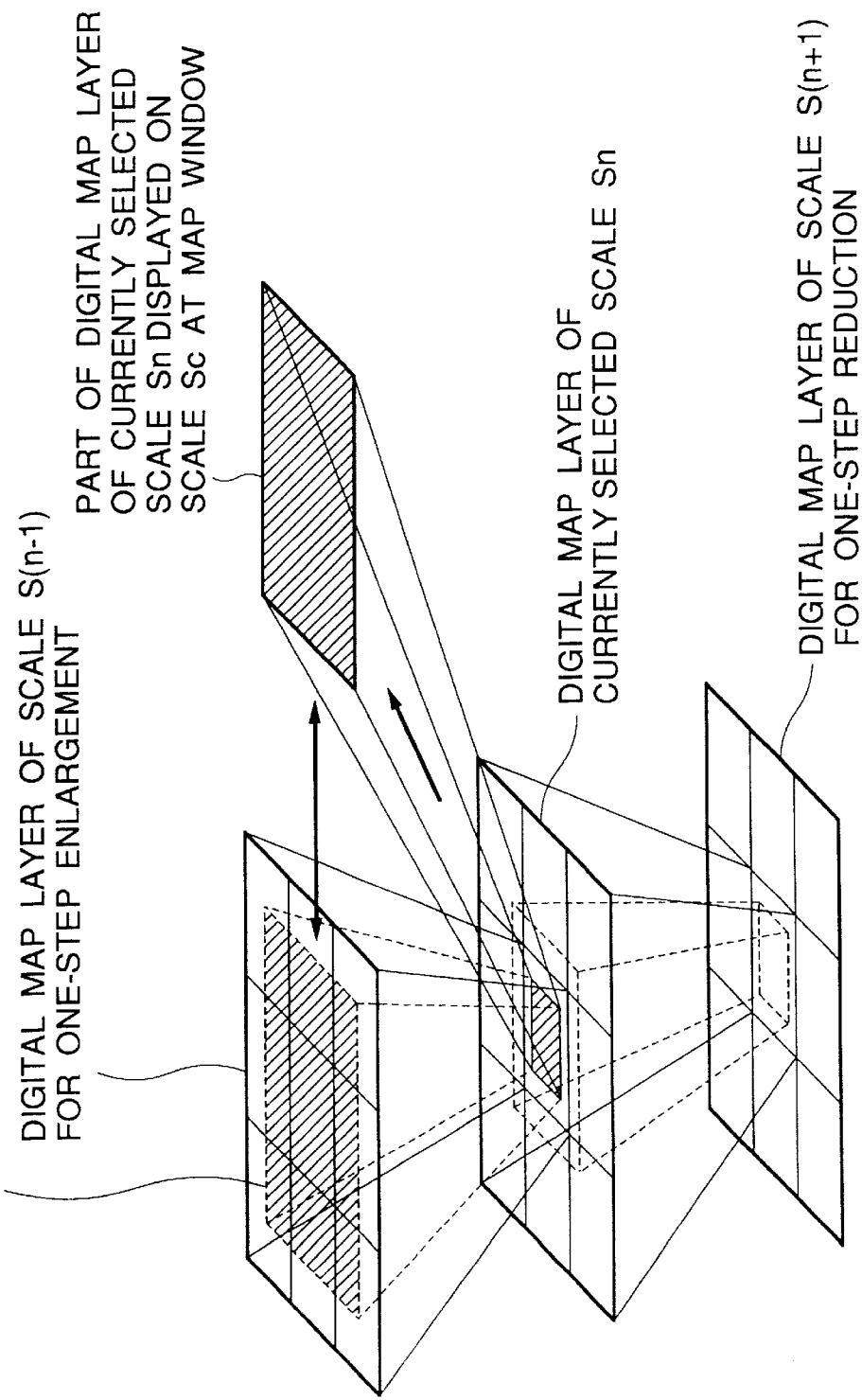
FIG. 8 is a view showing the concept for enlargement and reduction in continuous zooming.

FIG. 8 conceptually shows a currently selected digital map layer of scale Sn used in a continuous zooming, namely continuous enlargement and reduction, of the displayed portion, a digital map layer of scale S(n-1) for one-step enlargement and a digital map layer of scale S(n+1) for one-step reduction in three dimensions. The above digital map layers are the data for the program shown by the flowchart of FIG. 9.

Next, an example of carrying out an zooming operation of the displayed portion 150 of the digital map in FIG. 4 in accordance with the digital map zooming display program will be described with reference to FIG. 9.

A CD-ROM 88 is inserted into, for example, the CD-ROM drive 87 of FIG. 3. Alternatively, a floppy disc 89 is inserted into the floppy disc drive 86.

As a result, a preferred embodiment of the digital map display zooming program of the present invention, which is stored on the CD-ROM 88 or the floppy disc drive 89, is put onto the hard disc drive 2 of the hard disc via the bus BA.

When these preparations are finished, the window 130b is displayed at the display screen 4 of the display means 3 of FIG. 4. This window 130b is a window of the digital map.

Figure 9:
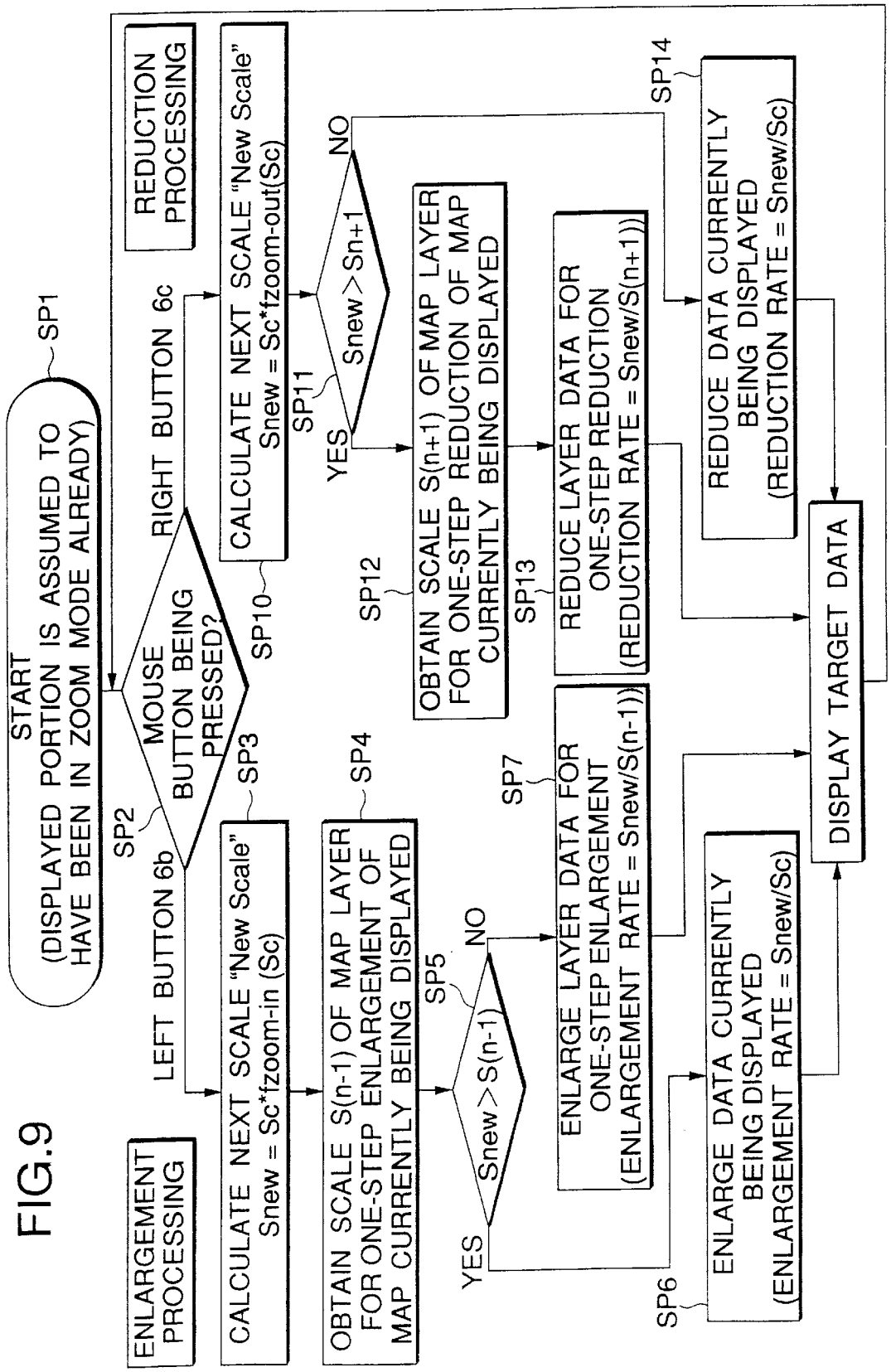
FIG. 9 is a view showing a flowchart for continuous zooming.

FIG. 9 is a flowchart showing continuous zooming at the displayed portion 150 of the digital map. At the time of starting continuous zooming using the mouse 6, the scale for the map layer, i.e. data, within the storage disc such as the CD-ROM is taken to be Sn (units: meter/dot) and this data is supposed to be in being displayed at the display screen 4 of FIG. 1 on a scale Sc.

Further, the unit (meter/dot) for the scale S expresses the actual distance on the map corresponding to one display pixel.

In FIG. 9, f zoom-in (Sc) represents the enlargement rate (for example, 80%) and fzoom-out (Sc) represents the reduction rate (for example, 125%). The enlargement rate and the reduction rate both relate to two dimensions (line segments).

Currently, the enlargement rate and the reduction rate are set so that they are in a relation as fzoom-in=1/fzoom-out= constant (for example, 0.8), but this value can be freely changed if so desired. For example, an operation is also possible which increases the enlargement rate depending on acceleration as the surface of the earth 2 becomes closer.

Upon starting in step SP1 of FIG. 9 it is assumed that the displayed portion of the digital map has already been in the zoom mode at this start time.

In step S2, a determination is made as to whether the left mouse button 6b of the mouse 6 or the right button 6c has been pressed.

When the left button 6b of the mouse 6 is pressed, the process goes to enlargement processing of step SP3, while the right button 6c is pressed, the process proceeds to the reduction processing of step SP10.

First, when the left button 6b is pressed, a calculation is carried out in step SP3 for the next scale "New Scale" that is set by the user pressing the left button 6b of the mouse 6. This new scale is expressed as "Snew". In step SP4, a scale S(n−1) of a map layer (data) is obtained which is for one-step enlargement of the digital map currently being displayed.

In step SP5, the new scale Snew and the scale S(n−1) in step SP4 are compared. When the new scale Snew is greater, the process goes to step SP6, and when this is not the case, the process goes to step SP7.

In step SP6, the map layer (data) currently being displayed is enlarged and displayed. While, in step SP7, the map layer (data) for one-step enlargement is enlarged.

By doing this, the displayed portion can be displayed with respect to the object data at the display screen 4 in FIG. 4.

Compared with this, when the right button 6c is pressed in step SP2, the calculation is carried out in step SP10 for the next scale "New Scale" that is set by the user with the right button 6c of the mouse 6. When this new scale Snew is larger than the scale Sn of the map layer on the disc, the process goes to step SP12 and when this is not the case, the process goes to step SP14.

In step SP12, a scale S(n+1) of the map layer which is obtained for one-step reduction of the map currently being displayed. Then, in step SP13, the map layer (data) is reduced which is for one-step reduction. Compared with this, the data currently being displayed is then reduced in step SP14.

The user can thus enlarge or reduce target data using the buttons 6b and 6c of the mouse 6 and, moreover, continuous enlarging or reducing of the displaying is possible.

Unlike the related art in which designation of enlarging and reducing is carried out with the dragging direction of a mouse, enlarging and reducing can be reliably designated using the left button 6b or the right button 6c of the mouse 6 irrespective of the dragging direction of the mouse as shown in FIG. 5 and FIG. 6 and operations can therefore be reliably and easily carried out.

As shown in FIG. 6, the region shown before reduction can be displayed in the map display after reduction.

A mode for continuously enlarging or reducing a specific region of the displayed portion 150 can be designated using the left button 6b and the right button 6c of the mouse 6. In addition, these regions to be enlarged or reduced can then be easily designated by dragging the mouse 6. Moreover, continuous enlargement or reduction can be carried out by the user keeping the left button 6b or the right button 6c pressed down.

The present invention is by no means limited to the above embodiment.

In the above embodiment an example is shown where the digital map display zooming program of the present invention is stored on the CD-ROM 88 or the floppy disc 89 shown in FIG. 1. However, the present invention is by no means limited in this respect, and this can also be stored so as to be installed beforehand on a hard disc of the hard disc drive 85. Alternatively, this digital map display zooming program can be stored on, for example, the hard disc 85 of the hard disc drive via a network such as an external internet. Other types of disc such as a high-density recording disc (DVD) can also be used as the recording medium.

Further, the digital map display zooming device of FIG. 2 is a notebook type personal computer, but the present invention is by no means limited in this respect, and can also be applied to desktop personal computers, navigation systems mounted on moving vehicles such as cars and to portable navigation systems.

The touch pads 12, 31 and 32 shown in FIG. 2 can also be used in place of the left and right buttons 6b and 6c of the mouse 6. In this case, the region within the displayed portion can be designated by the movements of a finger on the touch pad 12 instead of setting the amount of movement of the mouse 6. The touch pads 31 and 32 correspond to the left button 6b and the right button 6c of the mouse 6, respectively.

As described above, according to the present invention, the user can continuously enlarge or reduce the displayed portion of the digital map within a display screen.

What is claimed is:

1. In a digital map display zooming method for enlarging and reducing a displayed portion of a digital map as map information in digital form within a display screen of a display device with a pointing means, an improvement wherein operations of a first designating part and a second designating part of said pointing means designate continuously enlarging operation and continuously reducing operation of said displayed portion of said digital map within said display screen, respectively.

2. The digital map display zooming method of claim 1, wherein said pointing means is a mouse, and a region of said displayed portion to be enlarged is designated by moving said mouse with said first designating part being pressed and a region of said displayed portion to be reduced is designated by moving said mouse with said second designating part being pressed.

3. A digital map display zooming device for enlarging and reducing a displayed portion of a digital map as map information in digital form within a display screen, said device comprising:

display means having a display screen for displaying said displayed portion of said digital map;

pointing means, having a first designating part and a second designating part, for carrying out continuously enlarging operation and continuously reducing operation of said displayed portion of said digital map within said display screen by operating said first designating part and said second designating part, respectively; and arithmetic processing means for carrying out processing for performing continuously enlarging operation and continuously reducing operation of a displayed portion designated by operating said pointing means.

4. The digital map display zooming device of claim 3, wherein continuously enlarging operation of said displayed portion continues when said first designating part of said pointing means is kept being pressed and continuously reducing operation of said displayed portion continues when said second designating part of said pointing means is kept being pressed.

5. A storage medium for storing a digital map display zooming program for enlarging and reducing a displayed portion of a digital map as map information in digital form within a display screen of a display device with a pointing means, the improvement wherein said digital map display zooming program includes the steps of designating continuously enlarging operation and continuously reducing operation of said displayed portion of said digital map within said display screen by operations of a first designating part and a second designating part of said pointing means, respectively.

6. A digital map display zooming device for enlarging and reducing a displayed portion of a digital map as map information in digital form within a display screen, said device comprising:

a display having a display screen for displaying said displayed portion of said digital map;

a mouse having a first designating part and a second designating part, for carrying out continuously enlarging operation and continuously reducing operation of said displayed portion of said digital map within said display screen by operating said first designating part and said second designating part, respectively; and a processor for carrying out processing for performing continuously enlarging operation and continuously reducing operation of a displayed portion designated by operating said mouse.

7. The digital map display zooming device of claim 6, wherein the continuously enlarging operation of said displayed portion continues when said first designating part of said mouse is kept pressed and the continuously reducing operation of said displayed portion continues when said second designating part of said mouse is kept pressed.

8. A storage medium for storing a digital map display zooming program for enlarging and reducing a displayed portion of a digital map as map information in digital form within a display screen of a display device with a mouse, the improvement wherein said digital map display zooming program includes the steps of designating continuously enlarging operation and continuously reducing operation of said displayed portion of said digital map within said display screen by operations of a first designating part and a second designating part of said mouse, respectively.

9. An apparatus for enlarging and reducing a displayed portion of an object image, comprising:

memory means storing a plurality of the object image data having different scale ratios;

display means having a display screen for displaying said displayed portion of the object image;

pointing means for accepting a user operation to specify a location or an area to be enlarged or reduced;

a first designating part and a second designating part for carrying out continuously enlarging operation and continuously reducing operation of said displayed portion of the object data based on the user operation applied on said first designating part and said second designating part, respectively; and arithmetic processing means for carrying out processing for said enlarging operation and said reducing operation of said displayed portion of the object data within said display screen with said scale ratio set by a scale setting means.

10. A method for enlarging and reducing a displayed portion of an object image, comprising the following steps:

a step of storing a plurality of the object image data having different scale ratios in a memory means;

a step of displaying said displayed portion of the object image on a display screen of a display means;

a step of accepting a user operation to specify a location or an area to be enlarged or reduced by a pointing means;

a step of carrying out a continuously enlarging operation or a continuously reducing operation of said displayed portion of the object data based on said user operation applied on a first designating part or a second designating part, respectively, of said pointing means; and a step of carrying out processing for said enlarging operation or said reducing operation of said displayed portion of the object data within said display screen with said scale ratio set by a scale setting means by an arithmetic processing means.

11. Computer program operable to enlarge and reduce a displayed portion of an object image, wherein:

the program utilizes a memory means to store a plurality of object image data having different scale ratios;

the program utilizes a display means having a display screen to display said displayed portion of the object image;

the program utilizes a pointing means to accept a user operation to specify a location or an area to be enlarged or reduced;

the program utilizes a first designating part and a second designating part to carry out continuously enlarging operation and continuously reducing operation of said displayed portion of the object data based on the user operation applied on said first designating part and said second designating part, respectively; and the program utilizes an arithmetic processing means to carry out processing for said enlarging operation and said reducing operation of said displayed portion of the object data within said display screen with said scale ratio set by a scale setting means.

* * * * *